June 23, 1959 B. A. HARRIS 2,892,036

STATION IDENTIFYING CIRCUIT

Filed Feb. 11, 1957 4 Sheets-Sheet 1

INVENTOR.
BEN A. HARRIS
BY George J. Seligsohn
ATTORNEY

June 23, 1959 B. A. HARRIS 2,892,036

STATION IDENTIFYING CIRCUIT

Filed Feb. 11, 1957 4 Sheets-Sheet 3

2,892,036

STATION IDENTIFYING CIRCUIT

Ben A. Harris, Rochester, N.Y., assignor to General Dynamics Corporation, Rochester, N.Y., a corporation of Delaware Application February 11, 1957, Serial No. 639,482

9 Claims. (Cl. 179—17)

Figure 1:
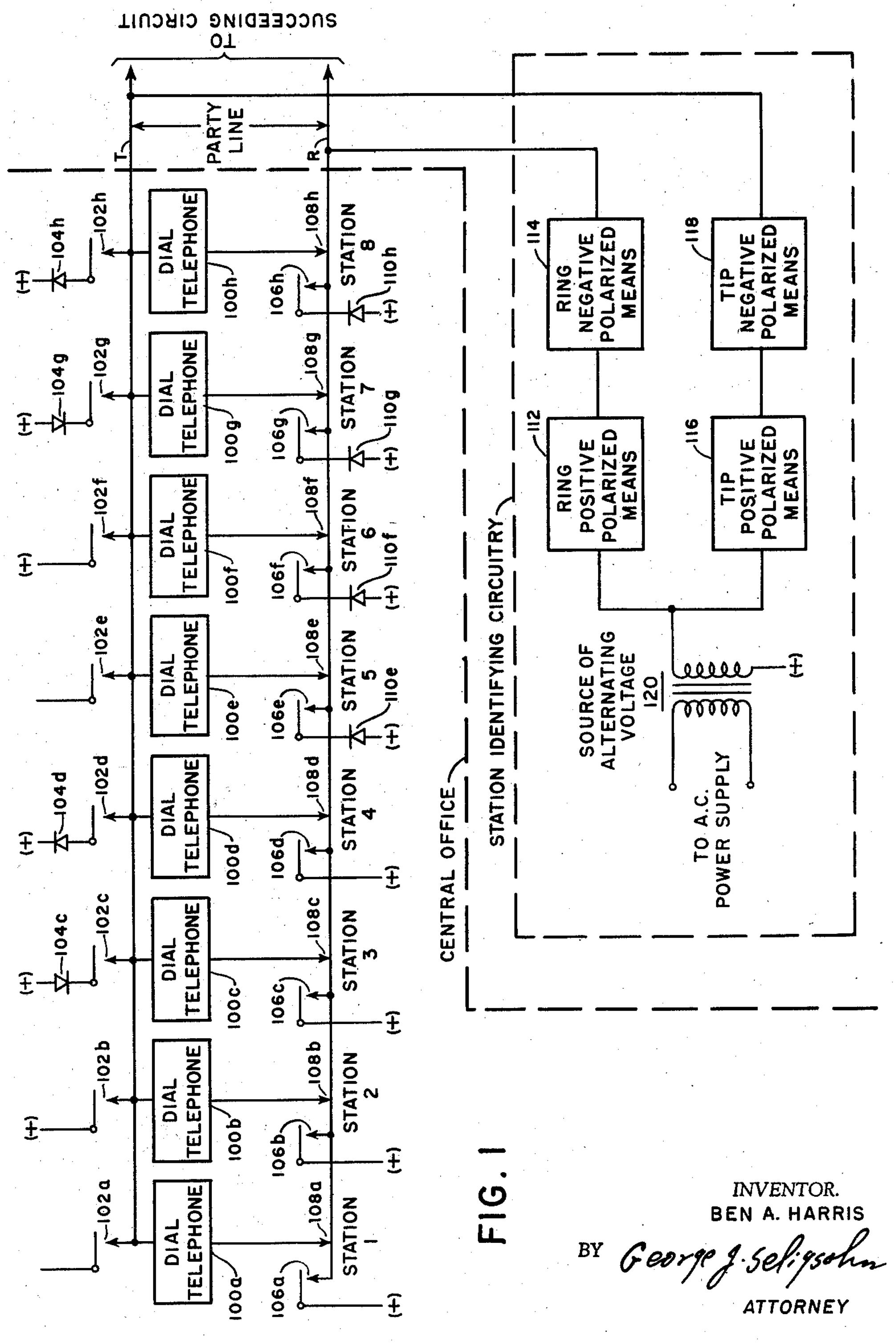

This invention relates to telephone systems and, more particularly, to a circuit for automatically identifying that particular one of a plurality of subscribers' stations on a party line which is initiating a call.

In automatic toll ticketing and metered service telephone systems, it is necessary to automatically identify the line and, in the case of party lines the station on the line, which is originating a call, so that the proper party can be charged.

Circuits for identifying a calling line are well known in the art, one, by way of example, being described in the copending application of Morris and Clement, Serial No. 536,573, filed September 26, 1955, and assigned to the same assignee as the present invention. Since the present invention does not concern line identifying circuits, but only circuits for identifying stations on a party line, the following disclosure will be limited thereto.

Most prior art party line station identifying circuits utilize mechanical means located at each station for generating a distinctive code signal manifesting the identity of that station. Such a station identifying circuit is disclosed in the above-identified Morris and Clement patent application. A few prior art party line station identifying circuits, usually restricted to two-party lines, employ electric, rather than mechanical, means for identifying each station.

The present invention contemplates an essentially all-electric circuit for identifying a relatively large plurality of stations on a party line. More specifically, the present invention makes use of a source of alternating current voltage and a group of polarized means. The first of the group of polarized means is connected between the source of alternating current voltage and a conductor in such a manner as to be operated when the alternating current has a given polarity if, at the same time, reference potential is applied to the conductor. A second of the group of polarized means is connected between the source of alternating current voltage and the conductor in such a manner as to be operated when the alternating current voltage has a polarity opposite to the given polarity if, at the same time, reference potential is applied to the conductor. In a similar manner, other polarized means may be connected between the source of alternating current voltage and a second conductor. By providing control means for connecting the party line to the first-mentioned conductor and the second conductor, if any, and by providing means at each station for applying reference potential to said party line in a distinctive preselected manner in accordance with the polarity of the alternating current voltage, a unique combination of polarized means will be operated in response to calls initiated from each particular station.

It is, therefore, an object of this invention to provide an improved party line station identifying circuit.

It is a further object of this invention to provide a party line station identifying circuit of the all-electric type for use with a relatively large plurality of stations.

It is a still further object of this invention to provide a station identifying circuit for a party line which is responsive to the polarity of an alternating voltage applied thereto and the presence of reference potential on a conductor thereof.

Figure 2:
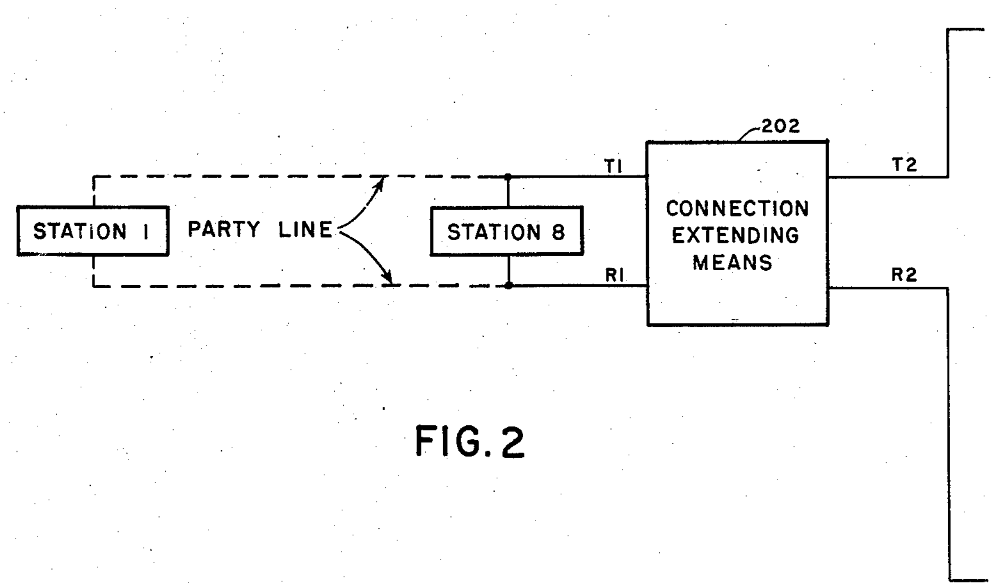
Figure 5:
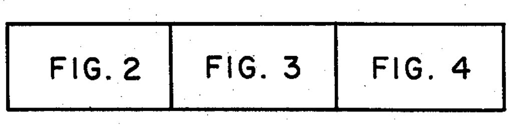
Figure 3:
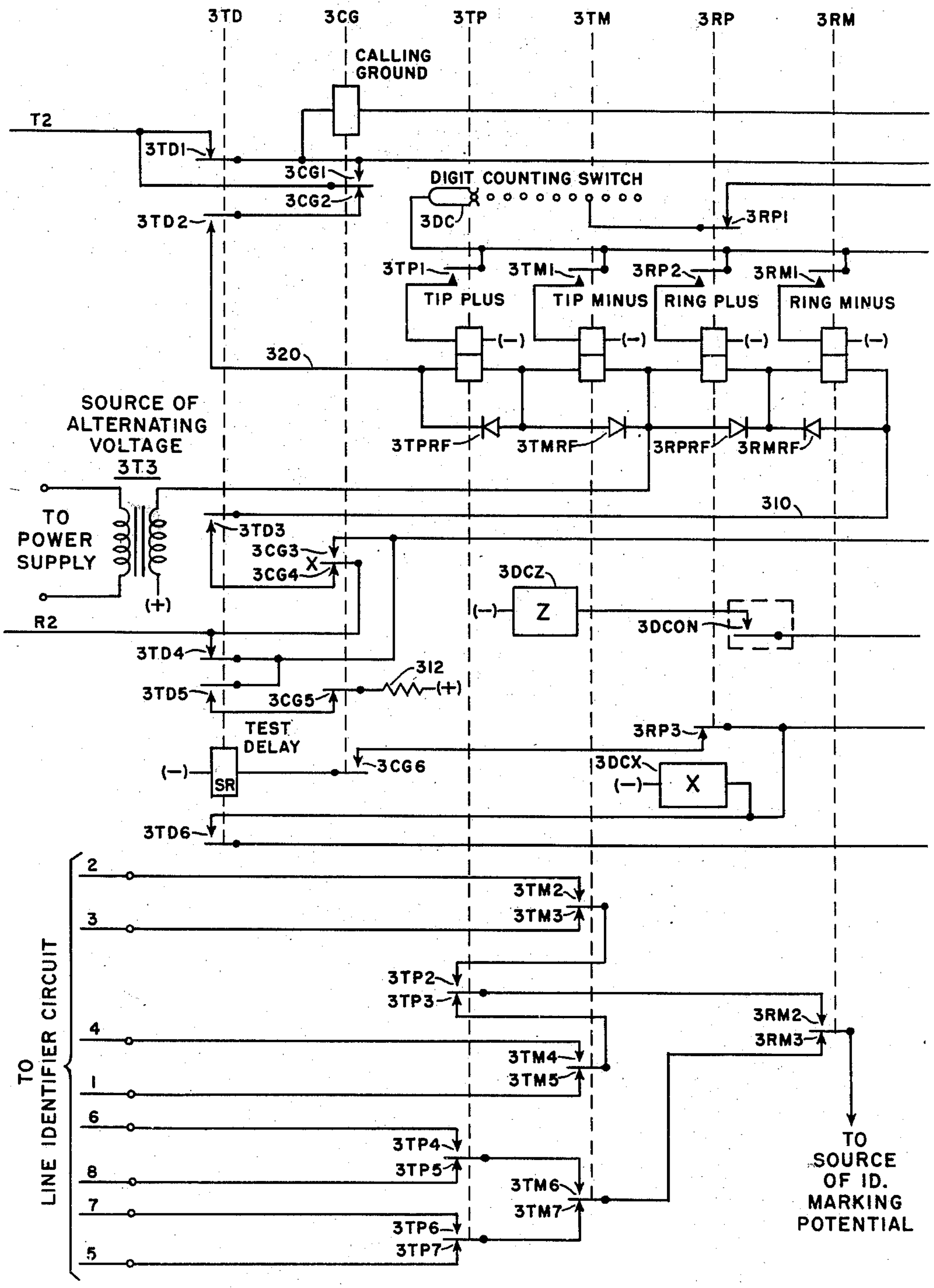
Figure 4:
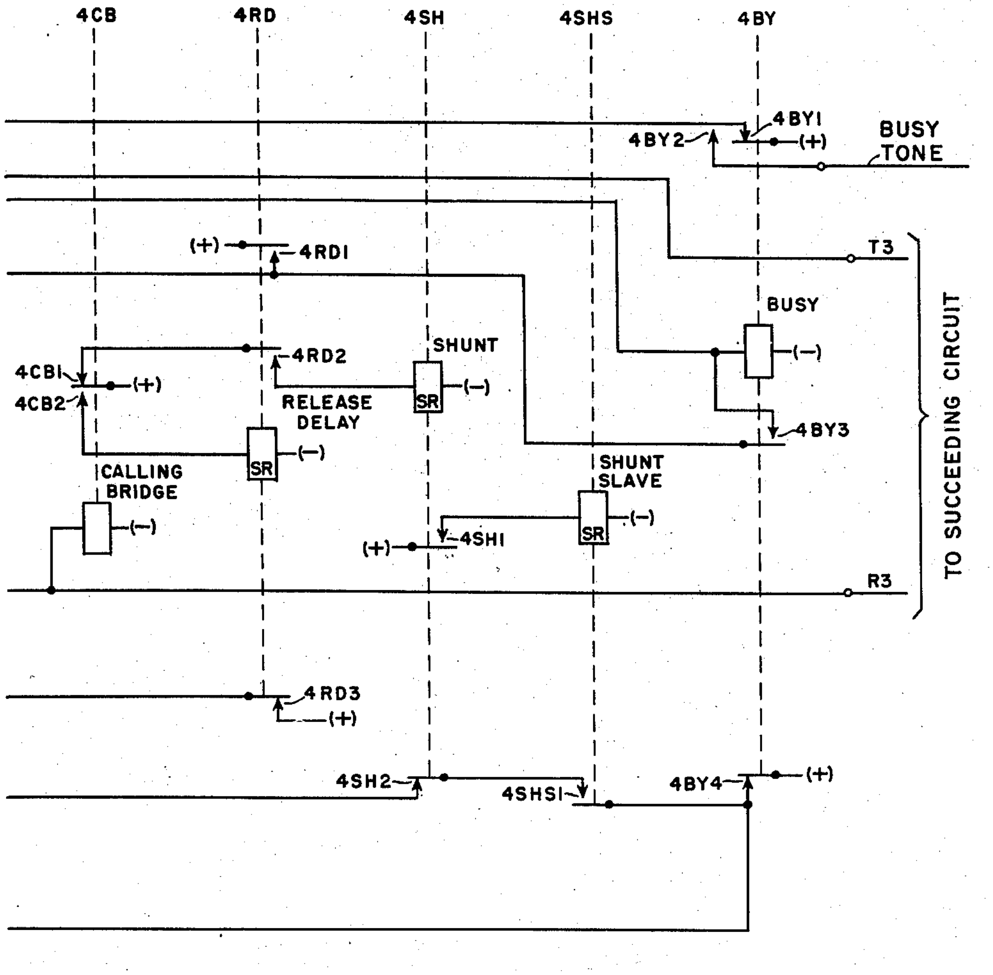

These and other objects and advantages of this invention will become more clear from the following detailed description taken together with the accompanying drawings wherein:

Fig. 1 is a block diagram illustrating the basic concept of the present invention, Figs. 2–4, inclusive, arranged as shown in Fig. 5, illustrate a block and schematic diagram of a preferred embodiment of the station identifying circuit forming the present invention, and, Fig. 5 shows the proper arrangement of Figs. 2–4, inclusive.

Referring now to Fig. 1, there is shown a two-wire party line consisting of wires T and R, respectively. Eight telephone stations are shown connected across this party line. Each of the stations includes a dial telephone, **100*a*–100*h*, respectively, which has one terminal thereof connected directly to the T wire of the party line and the other terminal thereof connected to the R wire of the party line through normally closed contacts 108*a*–108*h*, respectively. Each station further includes normally open contacts 102*a*–102*h*, respectively, connected to the T wire of the party line and normally open contacts 106*a*–106*h*, respectively, which form make-before-break contacts with contacts 108*a*–108*h*, respectively, connected to the R wire of the party line. Contacts 102, 106 and 108 individual to any station are momentarily operated in response to the wind up of the dial of the telephone 100** individual to that station.

In the case of station 1, the closure of contacts **102*a* is without effect and the opening of contacts 108*a* and the closing of contacts 106*a* is effective in connecting ground to the R wire of the party line. In the case of station 2, the closure of contacts 102*b* is effective in connecting ground to the T wire of the party line and the opening of contacts 108*b* and the closure of contacts 106*b* is effective in connecting ground to the R wire of the party line. In the case of station 3, the closure of contacts 102*c* is effective in connecting ground to the T wire of the party line through unidirectional conducting device 104*c*, which is poled as shown, and the opening of contacts 108*c* and the closure of contacts 106*c* is effective in connecting ground to the R wire of the party line. In the case of station 4, the closure of contacts 102*d* is effective in connecting ground to the T wire of the party line through unidirectional conducting device 104*d*, which is poled as shown, and the opening of contacts 108*d* and the closure of contacts 106*d* is effective in connecting ground to the R wire of the party line. In the case of station 5, the closure of contacts 102*e* is without effect and the opening of contacts 108*e* and the closure of contacts 106*e* is effective in connecting ground to the R wire of the party line through unidirectional conducting device 110*e*, which is poled as shown. In the case of station 6, the closure of contacts 102*f* is effective in connecting ground to the T wire of the party line and the opening of contacts 108*f* and the closure of contacts 106*f* is effective in connecting ground to the R wire of the party line through unidirectional conducting device 110*f*, which is poled as shown. In the case of station 7, the closure of contacts 102*g* is effective in connecting ground to the T wire of the party line through unidirectional conducting device 104*g*, which is poled as shown, and the opening of contacts 108*g* and the closure of contacts 106*g* is effective in connecting ground to the R wire of the party line through unidirectional conducting device 110*g*, which is poled as shown. In the case of station 8, the closure of contacts 102*h* is effective in connecting ground to the T wire of the party line through unidirectional conducting device 104***h*, which is poled as shown, and the opening of contacts 108*h* and the closure of contacts 106*h* is effective in connecting ground to the R wire of the party line through unidirectional conducting device 110*h*, which is poled as shown.

The party line extends to a central office where it is connected to station identifying circuitry as well as to a succeeding circuit for further extending the connection. The station identifying circuitry includes a source of alternating voltage consisting of transformer 120 which has its primary winding connected to an A.C. power supply (not shown). The R wire of the party line is connected through ring negative polarized means 114 and ring positive polarized means 112 in series to one terminal of the secondary winding of transformer 120. The other terminal of the secondary winding of transformer 120 is connected to ground. The T wire of the party line is connected through tip negative polarized means 118 and tip positive polarized means 116 in series to the first-mentioned terminal of the secondary winding of transformer 120. Ring positive polarized means 112 and tip positive polarized means 116 are operated only in response to voltage of a positive polarity with respect to ground being applied thereacross and ring negative polarized means 114 and tip negative polarized means 118 are operated only in response to a voltage of a negative polarity with respect to ground being applied thereacross.

In the case of calls initiated from stations 1–4, respectively, a connection is completed during both the positive and negative half cycles of the alternating voltage through ring positive polarized means 112 and ring negative polarized means 114 over the R conductor of the party line to ground. Therefore both ring positive polarized means 112 and ring negative polarized means 114 operate. In response to a call initiated at stations 5–8, respectively, the presence of unidirectional conducting device 110*e* to *h*, respectively permits a connection only during the negative half cycles of alternating voltage extending through ring positive polarized means 112 and ring negative polarized means 114 over the R wire of the party line to ground Therefore only ring negative polarized means 114 operates. In response to a call initiated at stations one and five respectively, no connection is completed to the T wire of the party line, so that neither tip positive polarized means 116 nor tip negative polarized means 118 operates. In response to a call initiated at stations two and six, respectively, during both the positive and negative half cycles of the alternating voltage a connection is completed through tip positive polarized means 116 and tip negative polarized means 118 over the tip wire of the party line to ground. Therefore, both tip positive polarized means 116 and tip negative polarized means 118 operate. In response to a call initiated at stations three and seven, respectively, due to the presence of unidirectional conducting devices 104*c* and 104*g*, respectively, poled as shown, a connection is completed through tip positive polarized means 116 and tip negative polarized means 118 over the T wire of the party line to ground only during the negative half cycles of the alternating voltage. Therefore, only tip negative polarized means 118 operates. In response to a call initiated at stations four and eight, respectively, the presence of unidirectional conducting devices 104*d* and 104*h*, respectively, poled as shown, a connection is completed through tip positive polarized means 116 and tip negative polarized means 118 over the T wire of the party line to ground only during the positive half cycles of the alternating voltage. Therefore, only tip positive polarized means 116 operates.

From the foregoing, it will be seen that a distinctive combination of polarized means 112, 114, 116 and 118 operates in accordance with which particular station on the party line initiates a call.

Although in Fig. 1 only eight stations are shown on the party line, four more stations may be added, which would be connected similarly to stations five to eight, respectively, except that the unidirectional conducting device connecting ground to the R wire of the party line would be reversed in polarity relative to unidirectional conducting devices 110*e–h*, respectively. In addition, a further four stations may be added to the party line by connecting them similarly to stations one to four, respectively, except that the ground connection to the R wire of the party line would be omitted. Thus, the present invention may be utilized in identifying up to sixteen stations on a two-wire party line. This would include utilizing the failure of any of the polarized means to operate to identify one of the stations, which might be undesirable. If this one case were omitted, up to fifteen stations on a party line could be identified by the operation of a distinctive combination of the four polarized means.

Furthermore, it is not essential that telephones 100*a–h*, respectively, be dial telephones. Any equivalent impulse-generating means, such as a key-set, could be substituted for the dial. In addition, the present invention contemplates the use of manual telephones, in which case contacts 102, 106 and 108 would be operated in conjunction with the hook switch.

Referring now to Figs. 2–4, there is shown a preferred embodiment of the invention. In Fig. 2, eight telephone stations, connected in a manner identical with the eight stations shown in Fig. 1, are connected across wires T1–R1 of a two-wire party line. Connection extending means 202, which comprises conventional impulse-operated switching means, is adapted to connect wire T1 of the party line to wire T2 and wire R1 of the party line to wire R2.

Considering Figs. 2 and 3, the initiation of a call from any one of the party line stations and the extension of the connection to wires T2 and R2 results in a direct current bridge being established over the extended loop between conductors T2 and R2, and provides an energization path for calling ground relay 3CG and calling bridge relay 4CB extending from ground, through normally closed contacts 4BY1, calling ground relay 3CG, normally closed contacts 3TD1, the extended loop between wires T2 and R2, normally closed contacts 3TD4, calling bridge relay 4CB to grounded battery, thereby causing the operation of both calling ground relay 3CG and calling bridge relay 4CB. In addition, the succeeding circuit is simultaneously seized over the closed circuit formed by wire T3, normally closed contacts 3TD1, wire T2, the extended loop, wire R2, normally closed contacts 3TD4, and wire R3.

The operation of calling ground relay 3CG effects the closure of normally open contacts 3CG1, 3CG3, and 3CG6 thereof and the opening of normally closed contacts 3CG2, 3CG4, and 3CG5 thereof. The closure of contacts 3CG1 provides a shunt about normally closed contacts 3TD1; the closure of contacts 3CG3 provides a shunt about normally closed contacts 3TD; and the closure of normally closed contacts 3CG6 prepares an operating circuit for test delay relay 3TD. The opening of normally closed contacts 3CG2, 3CG4 and 3CG5 is without effect at this time.

The operation of calling bridge relay 4CB is effective in opening normally closed contacts 4CB1 thereof and in closing normally open contacts 4CB2 thereof. The opening of normally closed contacts 4CB1 is of no effect at this time. The closure of normally open contacts 4CB2 provides an energization path for release delay relay 4RD, which is slow to release, extending from ground through operated contacts 4CB2 and release delay relay 4RD to grounded battery, thereby causing release delay relay 4RD to operate.

The operation of release delay relay 4RD effects the closure of normally opened contacts 4RD1 and 4RD2 thereof and the opening of normally closed contacts 4RD3 thereof.

The circuit remains in this condition until the calling subscriber dials a digit. As heretofore described in connection with Fig. 1 during the wind-up of the dial contacts 106 and 108 are momentarily closed, resulting in ground being extended to wires T2 or R2, or both. This ground, which is momentarily applied, is effective in shunting calling ground relay 3CG, which restores and then reoperates. However, this restoration and reoperation of calling ground relay 3CG is of no effect at this time. In response to the release of the dial, a series of impulses, equal in number to the digit dialed and each of which consists of a momentary break in the extended loop, is transmitted over the extended connection to wires T3 and R3 on to the succeeding circuit where they are utilized in further extending the connection. Also, calling ground relay 3CG and calling bridge relay 4CB restore and reoperate in synchronism with the transmitted impulses. In response to the first restoration of calling bridge relay 4CB an energizing path is established for shunt relay 4SH, which is slow to release, over a connecton extending from ground through normally closed contacts 4CB1, operated contacts 4RD2, and shunt relay 4SH to grounded battery, thereby causing shunt relay 4SH to operate.

The operation of shunt relay 4SH effects the closure of normally open contacts 4SH1 thereof and the opening of normally closed contacts 4SH2 thereof. The closure of contacts 4SH1 provides an energization path for shunt slave relay 4SHS, which is slow to release, extending from ground through operated contacts 4SH1 and shunt slave relay 4SHS to grounded battery, thereby causing shunt slave relay 4SHS to operate. The operation of shunt slave relay 4SHS is effective in closing normally open contacts 4SHS1 thereof.

Due to its slow to release characteristics shunt relay 4SH does not restore during the pulsing of calling bridge relay 4CB, but only restores in the interdigital time following the transmission of the above-mentioned series of impulses. The restoration of shunt relay 4SH causes normally open contacts 4SH1 thereof to be reopened, thereby breaking the energizing path for shunt slave relay 4SHS, and reclosing the normally closed contacts 4SH2 thereof. Shunt slave relay 4SHS does not restore immediately due to its slow release characteristics. During the interval between the restoration of shunt relay 4SH and the restoration of shunt slave relay 4SHS an energizing path is established for test delay relay 3TD, which is slow to release, extending from ground through normally closed contacts 4BY4, operated contacts 4SHS1, normally closed contacts 4SH2 and 3RP3, operated contacts 3CG6 and test delay relay 3TD to grounded battery to thereby operate test delay relay 3TD, and is established for X-magnet 3DCX of the digit counting switch, extending from ground through operated contacts 4SHS1, normally closed contacts 4SH2, and X-magnet 3DCX to grounded battery. At the end of the aforementioned interval, shunt slave relay 4SHS restores, reopeneing normally opened contacts 4SHS1, and breaking the just described operating path for test delay relay 3TD and X-magnet 3DCX. In response to the deenergization thereof, X-magnet 3DCX causes the wiper 3DC of the digit counting switch to be moved off-normal one step. This causes normally open off-normal contacts 3DCON of the digit counting switch to be closed.

The operation of test delay relay 3TD effects the opening of normally closed contacts 3TD1 and 3TD4 thereof and the closure of normally open contacts 3TD2, 3TD3, 3TD5 and 3TD6 thereof. The closure of contacts 3TD6 provides a holding path for test delay relay 3TD extending from ground through normally closed contacts 4BY4, operated contacts 3TD6, normally closed contacts 3RP3, operated contacts 3CG6 and test delay relay 3TD to grounded battery. Therefore, test delay relay 3TD remains operated despite the break in its original operating path at the end of the aforementioned interval. The opening of contacts 3TD1 and 3TD4, respectively, breaks one of the connections between wires T2 and T3, respectively, and R2 and R3, respectively. However, wire T2 is still connected to wire T3 through operated contacts 3CG1 and wire R2 is still connected to wire R3 through operated contacts 3CG3.

During the wind-up preceding the dialing of the next digit, ground is again momentarily applied over the extended loop to thereby shunt calling ground relay 3CG to cause it to restore, as previously described. The reopening of normally opened contacts 3CG6 breaks the above-described holding circuit for test delay relay 3TD, but test delay relay 3TD does not immediately restore due to its slow release characteristics. The reopening of normally open contacts 3CG1 and 3CG3, respectively, breaks the remaining connection between wires T2 and T3, respectively, and wires R2 and R3, respectively. However, the succeeding circuit is maintained seized and calling bridge relay 4CB is maintained operated by the reclosing of normally closed contacts 3CG5 which provide resistance ground on wire R3 extending from ground through resistance 312, normally closed contacts 3CG5, and operated contacts 3TD5 to wire R3.

The reclosing of contacts 3CG4 effects a connection between wire R2 and first conductor 310 extending through normally closed contacts 3CG4 and operated contacts 3TD3. The reclosing of normally closed contacts 3CG2 effects a connection between wire T2 and conductor 320 extending through normally closed contacts 3CG2 and operated contacts 3TD2.

Conductor 310 is connected through the serially-connected lower windings of ring-minus relay 3RM and ring-plus relay 3RP to one terminal of the secondary winding of alternating current voltage source transformer 3T3. The other terminal of the secondary winding of transformer 3T3 is connected to ground and the primary winding thereof is connected to an alternating current voltage power supply. The lower winding of ring-minus relay 3RM is shunted by unidirectional conducting device 3RMRF poled to be conductive in the direction shown and the lower winding of ring-plus relay 3RP is shunted by unidirectional conducting device 3RPRF poled to be conductive in the direction shown. Conductor 320 is connected through the serially-connected lower windings of tip-plus relay 3TP and tip-minus relay 3TM to the first-mentioned terminal of the secondary winding of transformer 3T3. The lower winding of tip-plus relay 3TP is shunted by unidirectional conducting device 3TPRF poled to be conductive in the direction shown and tip-minus relay 3TM is shunted by unidirectional conducting device 3TMRF poled to be conductive in the direction shown.

Which ones of relays 3TP, 3TM, 3RP and 3RM are operated in any given instance depends upon the particular station on the party line initiating the call. If ground is applied to conductor 310, by the station initiating the call over the previously described connection, when the alternating voltage has a positive polarity, ring-minus relay 3RM will be energized over a path extending from the source of alternating voltage, unidirectional conducting device 3RPRF and the lower winding of ring-minus relay 3RM to conductor 310. If ground is present on conductor 310 when the alternating voltage has a negative polarity, ring-plus relay 3RP will be operated over a connection extending from conductor 310 through unidirectional conducting device 3RMRF, the lower winding of ring-plus relay 3RP to the source of alternating voltage. If ground is present on conductor 320 when the alternating voltage has a positive polarity, tip-minus relay 3TM will be operated over a connection extending from the source of alternating voltage through the lower winding of tip-minus relay 3TM and the unidirectional conducting device 3TPRF to conductor 320. If ground is present on conductor 320 when the alternating voltage has a negative polarity, tip-plus relay 3TP will be operated over a connection extending from conductor 320 through the lower winding of tip-plus relay 3TP and unidirectional conducting device 3TMRF to the source of alternating voltage.

It will be seen that the following relays are operated in response to calls initiated at each respective station on the party line:

| Station: | Relays operating |
|---|---|
| 1 | 3RP, 3RM. |
| 2 | 3RP, 3RM, 3TP, 3TM. |
| 3 | 3RP, 3RM, 3TP. |
| 4 | 3RP, 3RM, 3TM. |
| 5 | 3RP. |
| 6 | 3RP, 3TP, 3TM. |
| 7 | 3RP, 3TP. |
| 8 | 3RP, 3TM. |

From the foregoing table it will be seen that a distinctive combination of relays operate in response to calls initiated at each respective station, and that ring-plus relay 3RP is included in each and every combination.

The operation of tip-plus relay 3TP effects the closure of normally open contacts 3TP1, 3TP2, 3TP4, and 3TP6 thereof and the opening of normally closed contacts 3TP3, 3TP5, and 3TP7 thereof. The operation of tip-minus relay 3TM effects the closure of normally open contacts 3TM1, 3TM2, 3TM4, and 3TM6 thereof, and the opening of normally closed contacts 3TM3, 3TM5, and 3TM7 thereof. The operation of ring-plus relay 3RP effects the opening of normally closed contacts 3RP1 and 3RP3 thereof, and the closing of normally open contacts 3RP2 thereof. The operation of ring-minus relay 3RM effects the closure of normally open contacts 3RM1 and 3RM2 thereof, and the opening of normally closed contacts 3RM3 thereof.

The closure of contacts 3TP1 provides a holding circuit for tip-plus relay 3TP extending from ground through operated contacts 4RD1 and 3TP1 and the upper winding of tip-plus relay 3TP to grounded battery. The closure of contacts 3TM1 provides a holding circuit for tip-minus relay 3TM extending from ground through operated contacts 4RD1 and 3TM1 and the upper winding of tip-minus relay 3TM to grounded battery. The closure of contacts 3RP2 provides a holding circuit for ring-plus relay 3RP extending from ground through operated contacts 4RD1 and 3RP2 and the upper winding of ring-plus relay 3RP to grounded battery. The closure of contacts 3RM1 provides a holding circuit for ring-minus relay 3RM extending from ground through operated contacts 4RD1 and 3RM1 and the upper winding of ring-minus relay 3RM to grounded battery.

So long as test delay relay 3TD remains operated, wire T2 is disconnected from wire T3 and calling ground relay 3CG cannot be reoperated. After a time determined by its slow release characteristics, test delay relay 3TD restores, reclosing contacts 3TD1 thereof, thereby permitting calling ground relay 3CG to reoperate.

Since a successful identification of the station on the party line is always accompanied by the operation of ring-plus relay 3RP, the opening of normally closed contacts 3RP3 thereof breaks the previously described operating path for test delay relay 3TD. Therefore, test delay relay 3TD is not reoperated during the aforementioned interval between the restoration of shunt relay 4SH and the restoration of shunt slave relay 4SHS following the dialing of each digit subsequent to the operation of ring-plus relay 3RP. However, digit counting switch X-magnet 3DCX continues to be operated during this interval, causing wiper 3DC of the digit counting switch to move forward one step in accordance with each dialed digit.

Contacts 3RM2 and 3RM3, of ring-minus relay 3RM, contacts 3TM2, 3TM3, 3TM4, 3TM5, 3TM6 and 3TM7, of tip-minus relay 3TM, and contacts 3TP2, 3TP3, 3TP4, 3TP5, 3TP6 and 3TP7, of tip-plus relay 3TP, form a tree capable of connecting a source of identification marking potential, such as shown and described in the above-identified patent application of Morris and Clement, to any one of eight station marking conductors of a line-identifier circuit, such as shown and described in the above-identified patent application of Morris and Clement. In accordance with which ones, if any, of relays 3TP, 3TM and 3RM are operated, the source of identification marking potential is connected to a particular one of the eight station marking conductors. As more fully described in the above-identified Morris and Clement patent application, marking potential is applied after the full complement of digits necessary to extend the connection to the called subscriber that has been dialed. The line-identifier circuit includes means responsive to the particular station marking conductor to which marking potential is applied for determining the directory number of the particular station on an identified party line which is initiating the call.

Should for one reason or another the station identifying circuit described herein fail, ring-plus relay 3RP will remain unoperated. In this case, after the full complement of digits, which is assumed to be seven, has been dialed by the calling subscriber busy relay 4BY will be operated over a connection extending from ground through operated contacts 4RD1, the wiper 3TDC and the seventh step position of the digit counting switch, normally closed contacts 3RP1, and busy relay 4BY to grounded battery. The operation of busy relay 4BY is effective in opening normally closed contacts 4BY1 and 4BY4 thereof and in closing normally open contacts 4BY2 and 4BY3 thereof. The closure of contacts 4BY3 provides a holding circuit for busy relay 4BY extending from ground through operated contacts 4RD1 and 4BY3 and busy relay 4BY to grounded battery. The opening of normally closed contacts 4BY4 is effective in removing operating and holding ground for test delay relay 3TD and in removing operating ground for X-magnet 3DCX to prevent any further dialing by the calling subscriber from having any effect. The opening of contacts 4BY1 and the simultaneous closing of contacts 4BY2 is effective in removing ground from the extended loop and substituting busy tone therefor, thereby indicating to the calling subscriber that he should hang up.

When the calling subscriber hangs up, thereby breaking the extended loop, calling bridge relay 4CB releases, thereby reopening contacts 4CB2 to break the energizing circuit for release delay relay 4RD. After a time determined by the slow release characteristics of release delay relay 4RD, this relay restores. In response to the restoration of release delay relay 4RD, contacts 4RD1 thereof are reopened, removing the holding ground for relays 3TP, 3TM, 3RP, and 3RM. Therefore, these relays restore. The reopening of contacts 4RD1 also removes the operating and holding ground for busy relay 4BY so that this relay, if operated, now restores.

If the digit counting switch should be off-normal when the calling subscriber hangs up, the reclosing of contacts 4RD3 provides an energization path for Z-magnet 3DCZ of the digit counting switch which extends from ground through normally closed contacts 4RD3, operated contacts 3DCON and Z-magnet 3DCZ to grounded battery, thereby operating Z-magnet 3DCZ. In response to the operation of Z-magnet 3DCZ, wiper 3DC of the digit counting switch is restored to its normal position, and in response thereto off-normal contacts 3DCON are opened, thereby breaking the operating path for Z-magnet 3DCZ. The station identifying circuit is now in its initial state, ready for the next call.

Although only a preferred embodiment of this invention has been described herein, it is not intended that applicant's invention be limited thereto, but only by the scope of the claims appended hereto.

I claim:

1. In a telephone system, a station identifying circuit comprising a source of alternating current voltage having two terminals, polarized first means operated only in response to voltage of a given polarity being applied thereacross, polarized second means operated only in response to voltage of a polarity opposite to said given polarity being applied thereacross, a conductor, third means for coupling said first and second means between one terminal of said source and said conductor, a party line having a plurality of telephone stations thereon, and fourth means responsive to a call initiated at a first one of said plurality of said stations for providing a conductive path between said conductor and the other terminal of said source only when said alternating current voltage has said given polarity to thereby effect the operation of only said first means in response to a call initiated at said first one of said plurality of stations; wherein said fourth means further includes fifth means responsive to a call initiated at a second one of said plurality of stations for providing a conductive path between said conductor and the other terminal of said source only when said alternating voltage has said polarity opposite to said given polarity to thereby effect the operation of only said second means in response to a call initiated at said second one of said plurality of stations; wherein said fourth means includes sixth means for extending a connection between said party line and said conductor, and seventh means located at said first one of said plurality of stations comprising a first pair of normally open contacts and a first unidirectional conducting device serially connected between the other terminal of said source and said party line, and eighth means responsive to a call initiated at said first one of said plurality of stations for closing said first pair of contacts, said first unidirectional conducting device being poled to be conductive only when said alternating voltage has said given polarity, and wherein said fifth means is located at said second one of said plurality of stations and comprises a second pair of normally open contacts and a second unidirectional conducting device serially connected between said one terminal of said source and said party line, and ninth means responsive to a call initiated at said second one of said plurality of stations for closing said second pair of contacts, said second unidirectional conducting device being poled to be conductive only when said alternating voltage has said polarity opposite to said given polarity.

2. In a telephone system, a station identifying circuit comprising a source of alternating current voltage having two terminals, polarized first means operated only in response to voltage of a given polarity being applied thereacross, polarized second means operated only in response to voltage of a polarity opposite to said given polarity being applied thereacross, a conductor, third means for coupling said first and second means between one terminal of said source and said conductor, a party line having a plurality of telephone stations thereon, and fourth means responsive to a call initiated at a first one of said plurality of said stations for providing a conductive path between said conductor and the other terminal of said source only when said alternating current voltage has said given polarity to thereby effect the operation of only said first means in response to a call initiated at said first one of said plurality of stations; wherein said fourth means further includes fifth means responsive to a call initiated at a second one of said plurality of stations for providing a conductive path between said conductor and the other terminal of said source when said alternating voltage has both said given polarity and said polarity opposite to said given polarity to thereby effect the operation of both said first and second means in response to a call initiated at said second one of said plurality of stations.

3. In a telephone system, a station identifying circuit comprising a source of alternating current voltage having two terminals, polarized first means operated only in response to voltage of a given polarity being applied thereacross, polarized second means operated only in response to voltage of a polarity opposite to said given polarity being applied thereacross, a conductor, third means for coupling said first and second means between one terminal of said source and said conductor, a party line having a plurality of telephone stations thereon, and fourth means responsive to a call initiated at a first one of said plurality of said stations for providing a conductive path between said conductor and the other terminal of said source only when said alternating current voltage has said given polarity to thereby effect the operation of only said first means in response to a call initiated at said first one of said plurality of stations; wherein said fourth means includes fifth means for extending a connection between said party line and said conductor and wherein said fourth means includes sixth means located at said first one of said plurality of stations comprising a pair of normally open contacts and a unidirectional conducting device serially connected between the other terminal of said source and said party line, and seventh means responsive to a call initiated at said first one of said plurality of stations for closing said pair of contacts, said unidirectional conducting device being poled to be conductive only when said alternating voltage has said given polarity.

4. The station identifying circuit defined in claim 3, wherein each of said plurality of stations includes subscriber-controlled switch-directing impulse-generating means, wherein said fifth means includes impulse-controlled switch means, and wherein said seventh means is operated in response to an operation of said impulse-generating means of said first one of said plurality of said stations.

5. In a telephone system, a station identifying circuit comprising a source of alternating current voltage having two terminals, polarized first and second means operated only in response to voltage of a given polarity being applied thereacross, polarized third and fourth means operated only in response to voltage of a polarity opposite to said given polarity being applied thereacross, first and second conductors, fifth means for coupling said first and third means between one terminal of said source and said first conductor, sixth means for coupling said second and fourth means between said one terminal of said source and said second conductor, a two-wire party line having a plurality of telephone stations thereon, seventh means responsive to a call initiated at any one of said stations for extending a connection between one wire of said party line and said first conductor and between the other wire of said party line and said second conductor, and eighth means located at a first one of said plurality of stations and responsive to a call initiated therefrom for providing a predetermined unique connection between the other terminal of said source and at least one of said wires of said party line during at least given alternate half-cycles of said alternating current voltage to thereby operate a particular distinctive combination of said first, second, third and fourth means to manifest the identity of said first station.

6. The station identifying circuit defined in claim 5, wherein each of said plurality of stations includes subscriber-controlled impulse generating means for transmitting a plurality of series of impulses over said party line, wherein said eighth means includes ninth means coupled to said impulse generating means for momentarily providing said predetermined connection immediately prior to the transmission of a series of impulses, and wherein said seventh means includes tenth means responsive to the completion of a series of impulses transmitted thereto for preparing a connection between said one wire of said party line and said first conductor and between said other wire of said party line and said second conductor, and eleventh means responsive to the providing of said predetermined connection for completing said prepared connections.

7. The station identifying circuit defined in claim 6, wherein said predetermined connection includes a connection between said other terminal of said source and said one wire of said party line when said alternating voltage has said given polarity, whereby said first means is operated in response to a call initiated at said first station, and wherein said seventh means further includes twelfth means responsive after the transmission thereto of a given number of series of impulses to the failure of operation of said first means for returning busy tone.

8. The station identifying circuit defined in claim 5, wherein each of said first, second, third and fourth means includes a relay and a unidirectional conducting device shunting said relay, wherein said fifth means connects said relays of said first and third means in series between said one terminal of said source and said first conductor, said unidirectional conducting device shunting said relay of said third means being poled to be conductive when said alternating voltage has said given polarity and said unidirectional conducting device shunting said relay of said first means being poled to be conductive when said alternating voltage has said polarity opposite to said given polarity, and wherein said sixth means connects said relays of said second and fourth means in series between said other terminal of said source and said second conductor, said unidirectional conducting device shunting said relay of said fourth means being poled to be conductive when said alternating voltage has said given polarity and said unidirectional conducting device shunting said relay of said second means being poled to be conductive when said alternating voltage has said polarity opposite to said given polarity.

9. The station identifying circuit defined in claim 8, wherein each of said first, second, third and fourth means includes ninth means for holding the relay thereof operated after the relay thereof has been initially operated.

References Cited in the file of this patent

UNITED STATES PATENTS

| | | |
|---|---|---|
| 1,831,385 | Hague | Nov. 10, 1931 |
| 1,841,084 | Bragg | Jan. 12, 1932 |
| 2,306,173 | Logan | Dec. 22, 1942 |
| 2,619,546 | Myers | Nov. 25, 1952 |
| 2,785,228 | Gulbrandsen | Mar. 12, 1957 |